March 9, 1937. N. EN HOLM 2,072,881
INTERNAL COMBUSTION ENGINE
Filed Oct. 7, 1933 3 Sheets-Sheet 1
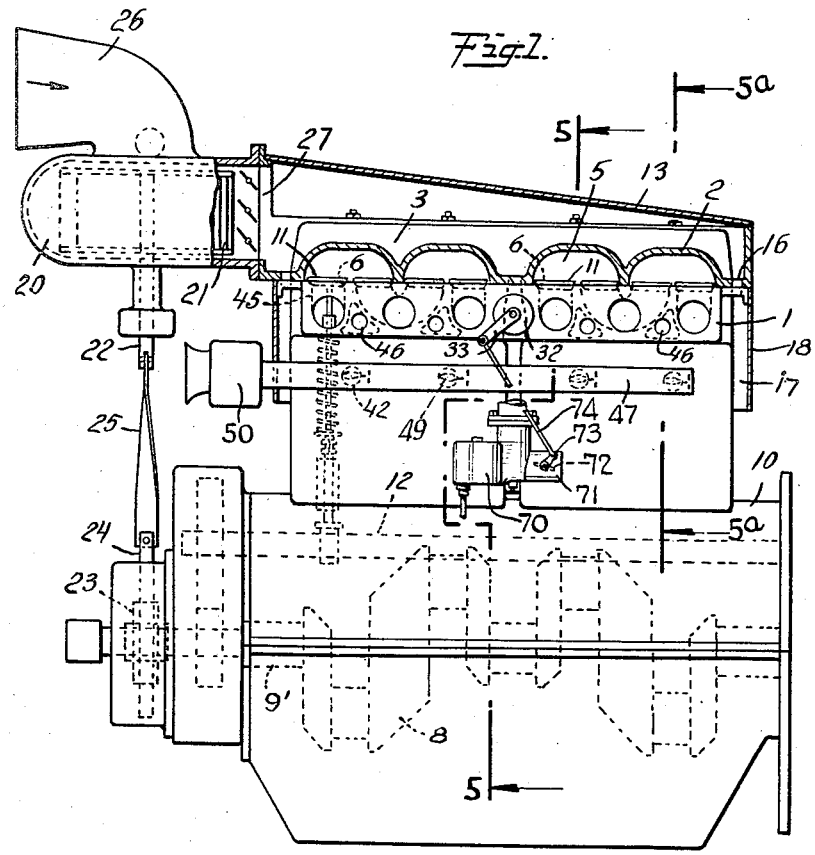

March 9, 1937. N. EN HOLM 2,072,881
INTERNAL COMBUSTION ENGINE
Filed Oct. 7, 1933 3 Sheets-Sheet 2
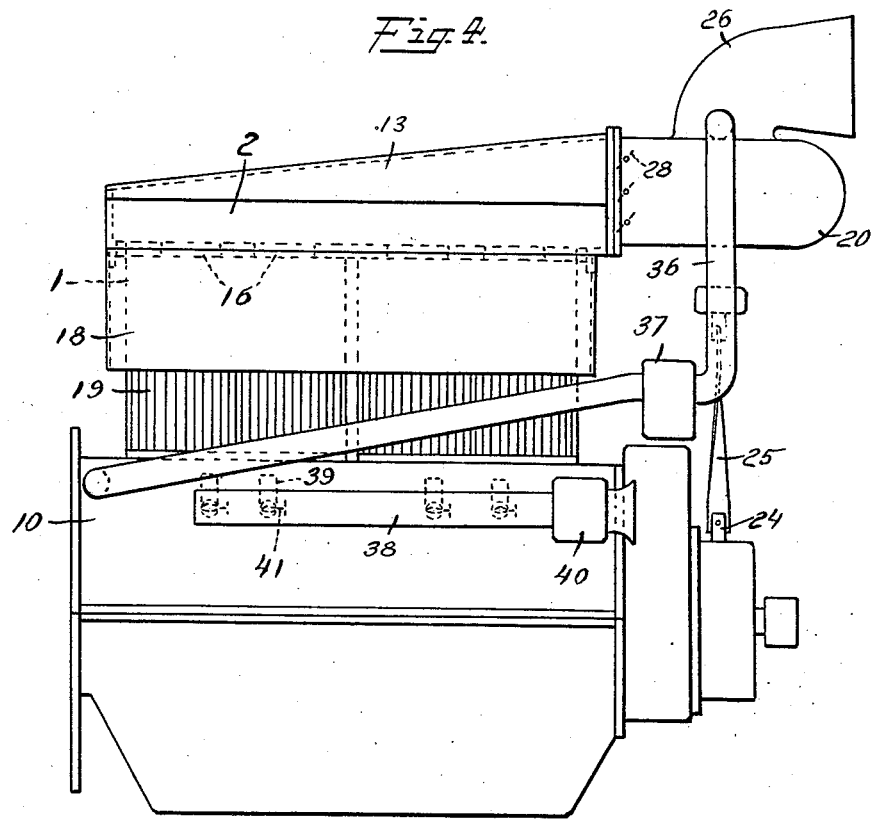
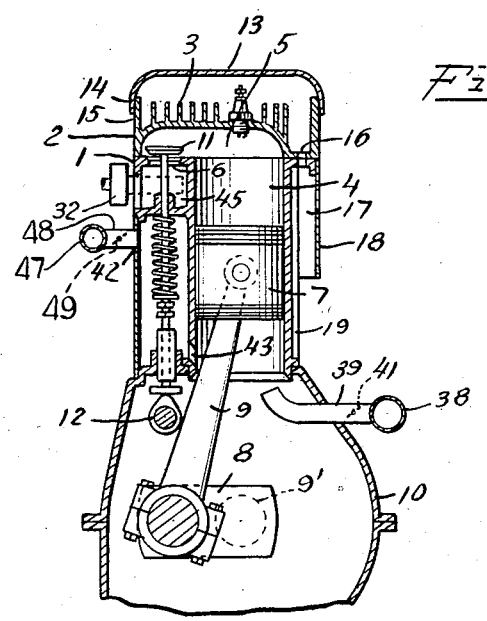
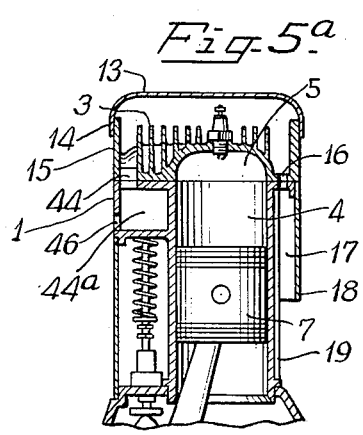

March 9, 1937. N. EN HOLM 2,072,881
INTERNAL COMBUSTION ENGINE
Filed Oct. 7, 1933 3 Sheets-Sheet 3
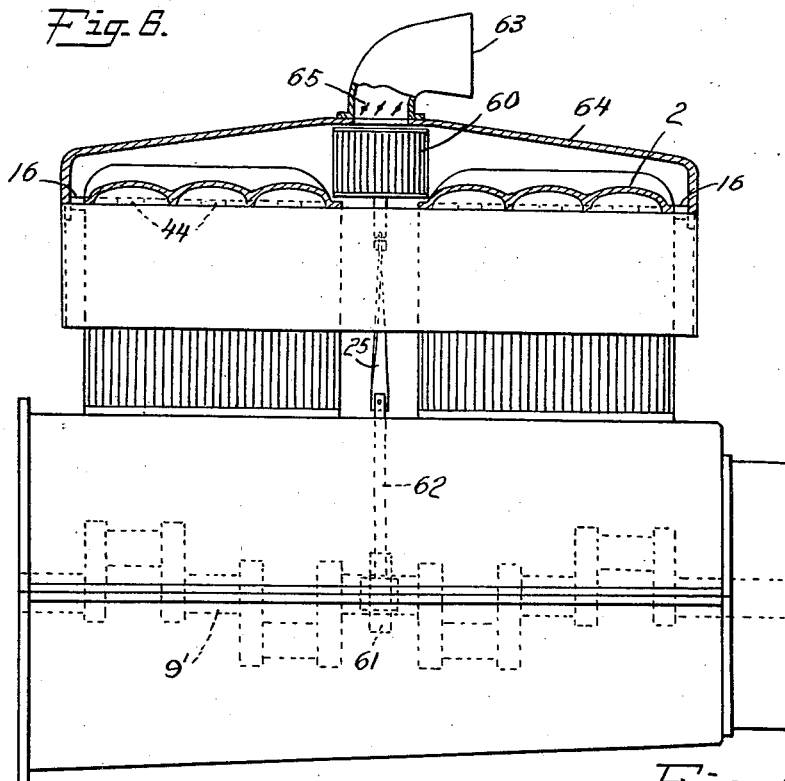
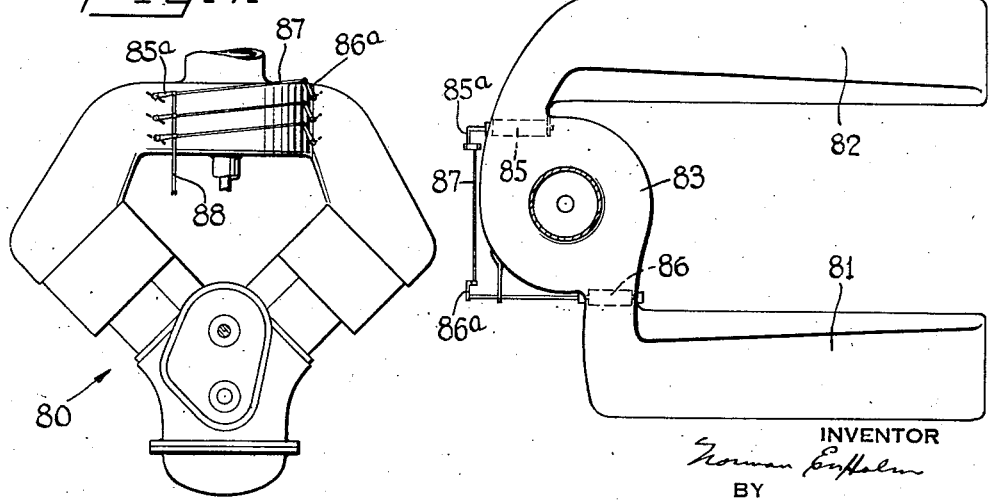

Patented Mar. 9, 1937

2,072,881

UNITED STATES PATENT OFFICE 2,072,881

INTERNAL COMBUSTION ENGINE

Norman En Holm, New York, N. Y., assignor to one-half to Henry T. Lilliendahl, New York, N. Y.

Application October 7, 1933, Serial No. 692,601

10 Claims. (Cl. 123—171)

This invention relates to internal combustion engines and is particularly directed to a device for air cooling an engine.

An object of this invention is to provide an internal combustion engine having means for uniformly cooling the same so that there will be no uneven strains on the engine parts by the internal heat developed.

A further object of this invention is to cool the external portions of the engine as well as the interior of the cylinders and valve housings and the pistons.

A still further object of this invention is to control the temperature of the engine for maintaining a substantially uniform temperature.

Another object of this invention is to provide in an internal combustion engine of the character described means controlled by the heat of the engine to adjust the carburetor fuel mixture whereby the engine may be fed a richer mixture when it is cold and a leaner mixture when it is warm and thus further controlling the temperature of the engine.

Still another object of this invention is to provide a strong, rugged, compact air cooling device for an internal combustion engine which shall comprise comparatively few and simple parts, which shall be relatively inexpensive to manufacture, which may be installed on engines now in use or incorporated into new engines, which shall be smooth and positive in operation, and nevertheless, practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of an engine provided with cooling means embodying the invention, with parts in cross-section;

Fig. 2 is a horizontal, sectional view of the cooling head;

Fig. 3 is a side elevational view of the shutter control mechanism;

Fig. 4 is a side elevational view of the engine shown in Fig. 1 from an opposite side;

Fig. 5 is a transverse, vertical, sectional view through one of the cylinders of the cooling mechanism associated therewith;

Fig. 5a is a partial, cross-sectional view taken on line 5a—5a of Fig. 1;

Fig. 6 is a side elevational view of another form of the invention;

Fig. 7 is an elevational view of a V-type engine provided with a cooling system embodying the invention; and Fig. 8 is a top plan view thereof.

Referring to Figs. 1 to 5a of the drawing, the reference numeral 1 designates generally the cylinder block which may comprise any number of cylinders as is customary in the construction of internal combustion engines. The air cooling system forming the subject matter of this invention is so designed that the engine cylinders may be cast en bloc in the customary manner. A cylinder head 2 is arranged over the cylinder block and may be provided with a plurality of cooling fins 3 on its upper side, as shown in Figs. 1 and 5 of the drawings.

Referring to Fig. 5, the cylinder 4 communicates with the space 5 within the head in the usual manner and valve ports 6 also communicate with the space within the head. A piston 7 is mounted in the cylinder and is connected to a crank 8 by a piston rod 9 in the usual manner. The crank 8 is carried by the crank shaft 9' mounted in the crank casing 10. The valve port 6 is controlled by a valve 11 of conventional construction. The valve is operated from a cam shaft 12 driven by the crank shaft in the usual manner.

The cooling system forming the subject matter of the invention consists of a casing 13 which is mounted over the cylinder head and spaced therefrom as shown and forming a chamber therewith. The casing member 13 is provided with flanges or lips 14 engaging the edges 15 of the cylinder head whereby the casing is closed on each side. The cylinder head casting is provided with suitable openings 44 and 16 (see Fig. 2), the latter communicating with cooling spaces 17 on the sides of the engine cylinder. These cooling spaces are formed by plates 18 spaced from the side and end walls of the cylinder. The side wall may be corrugated as indicated at 19 (see Fig. 4). The openings 16 are preferably of unequal sizes and may be designed or proportioned to feed varying amounts of air to the different cylinders of an engine whereby those cylinders which are found in actual operation to develop the most heat may be caused to receive a greater amount of the cooling fluid. The size of said opening 16 is therefore proportional to the heat developed at the adjacent cylinders.

The openings 44 in the cylinder head communicate with the spaces 44a surrounding the valve housings 45 to permit circulation of the cooling air around the valves. These spaces in turn communicate with the atmosphere through openings 46.

The front end of the casing 13 communicates with a blower casing 20. A rotary fan blower 21 is mounted in the casing and is carried by a vertical shaft 22. Said shaft is adapted to be driven from the crank shaft by suitable gearings 23 which drive a vertical shaft 24. The shaft 22 is in vertical alignment with the shaft 24 and is connected thereto by a strip 25 of spring metal, thus forming a flexible connection between the gearing and the fan.

The blower is provided with a suitable inlet 26 and the outlet or discharge end 27 thereof communicates with the front end of the casing 13. A plurality of parallel shutters 28 are mounted in the blower discharge preferably on pivot pins or pintles 29. The shutters are provided with arms 30 connected at the upper ends thereof, to each other by a connecting link 31. A thermostat 32 of any suitable type is arranged in the engine block, as shown in Fig. 1 of the drawings. The thermostat may be arranged at any suitable point dictated by the design and construction of the particular engine. The thermostat is connected to an arm 33 which is connected by a link 34 to an arm 35 connected to one of the pivot pins 29 of the shutters. It will be apparent that the regulation of the air feed is thus automatically controlled by the operation of the thermostat. Upon rise in temperature of the cylinders, the thermostat will act to swing arms 33 in a counterclockwise direction, looking at Fig. 3, and open the shutters to a greater degree and admit a greater amount of cooling air from the blower. As the cylinders cool, the arm 33 swings in a clockwise direction and the flow of air is reduced by action of the thermostat.

The construction heretofore described, provides means for cooling the exterior of the engine cylinders. I further provide means for introducing atmospheric air into the crank case to cool the interior of the cylinders, and the pistons and into the valve spring housing to cool the valve mechanism. As shown, a pipe or conduit 36 is connected to the blower casing 20 at one end and to the crank case 10 at the other end whereby heated air will be exhausted from the crank case and will maintain a slight vacuum therein. An oil collector 37 may be arranged in this pipe. I further provide an air inlet pipe 38 extending longitudinally of the crank case having branches 39 extending into the crank case in alignment with each of the cylinders, directing the air so as to impinge on the interior of the piston. Pipe 38 may be provided with a suitable dust collector 40. The branch pipes 39 may be provided with valves 41 to permit control or regulation of the air delivered to each piston. Said valves 41 may be of any suitable construction and are preferably adjusted and set.

I also provide openings 42 in the valve spring housing through which air is adapted to be drawn. Openings 42 communicate with a longitudinally extending pipe or header 47 through branches 48. Each of the branches may be provided with a butterfly valve 49. Header 47 is open to the atmosphere, and may be provided with a dust collector 50. Air entering the valve spring housings through branch pipes 48 passes into the crank case below the piston through openings 43 in the cylinder wall. The slight vacuum in the crank case will cause air to flow from the valve housing into the crank case and hence flow of air through pipes 47 and 48 into said valve housings for cooling the same. The construction just described not only provides means for cooling the interior of the piston and the valve mechanism but is also of advantage in bad weather in that the introduction of warm air into the blower casing through the pipe 36 prevents the accumulation of ice or sleet in the blower when the vehicle is operating in stormy weather at near or below freezing temperatures. The valve housing walls may be cooled by air from the blower entering the openings 44 and passing out through openings 46.

Means is further provided for regulating the carburetor of the engine whereby the richness of the fuel mixture is controlled by the heat of the engine. To this end the carburetor 70, which may be of any suitable construction, is provided with an air inlet 71 having a butterfly valve 72 therein. Attached to the valve 72 is an arm 73 disposed externally of the inlet 71. Interconnecting the arm 33 of the thermostat 32 with said arm 73 is a link 74. The valve 72 is so connected to the arm 33 that as the engine heats up and the arm 33 moves in a counterclockwise direction, looking at Fig. 3 of the drawings, for opening the shutters 28, the valve 72 will also open to provide a leaner mixture. As the arm 33 moves in a clockwise direction, looking at Fig. 3 upon the engine cooling down, the shutters 28 will be moved towards closing position to cut down the flow of air above the cylinder head, and the valve 72 will be moved toward closing position for cutting down the flow of air through the inlet 71 whereby the engine is fed a richer mixture. Since a richer mixture tends to heat up the engine, control of the richness of the mixture will control the temperature of the engine. The temperature of the engine is thus controlled simultaneously through the blower and the carburetor whereby a uniform heat may be maintained.

In Fig. 6 of the drawings, I have shown a form of the invention adapted particularly for use with six and eight cylinder engines with the cylinders arranged in line. As shown, a blower 60 is arranged centrally of the engine block and is driven from the crank shaft 9' by suitable gearing 61. This gearing drives a vertical shaft 62 connected to the shaft of the blower by a strip 25 of spring metal similar to the drive in the form shown in Figs. 1 to 5a. The blower is provided with a suitable inlet 63 and is arranged within a casing 64 similar to the casing 13 heretofore described and spaced from the cylinder head 2 in the same manner. As the blower is arranged directly in the casing covering the cylinder head and is not provided with a separate casing the air discharged from the blower is directed over the cylinder head in all directions. The shutters 65 which control the amount of air passing through the blower are therefore placed on the inlet side 63 of the blower. These shutters may be controlled by a thermostat in the manner heretofore described and inasmuch as the operation of the thermostat is essentially the same as in the form heretofore described, further description and illustration of it is believed to be unnecessary. The casing 64 is spaced from the cylinder head and the front and side walls of the cylinder in the same manner as the casing 13 and the cylinder head is provided with the openings 16 and 44 by means of which the air passes around the various portions of the engine block. A detailed description of these portions of the form shown in Fig. 6, is, therefore, believed to be unnecessary.

The construction herein provided will give uniform and even cooling of an internal combustion engine and will allow the use of engine parts now used in the construction of internal combustion engines cooled by water. It is designed to prevent uneven strains on the parts of the engine and the engine cylinders may, therefore, be cast en bloc as is the usual practice in the construction of most internal combustion engines for automobile use. The thermostatic regulation of the admission of air and the control of the feed to the various cylinders by the regulation of the size of the openings 16 permits very efficient results to be obtained and produces uniform cooling of the engine cylinders regardless of the conditions under which the engine is operating.

In Fig. 7 there is illustrated a usual V-type engine 80 provided with a pair of casings 81 and 82 covering the two lines of cylinder heads and forming chambers communicating with a central blower 83 located adjacent one end of the engine. The outlet ends of the blower 83 may be controlled by sets of shutters 85 and 86 having arms 85a and 86a, respectively, interconnected by links 87. A member 88 connected to the arms 85 may be interconnected to a thermostat, similar to the thermostat 32, and located in any suitable point on the engine 80. The engine 80 may be provided with suitable plates 18 and openings 44 and 16 whereby air may be delivered around the cylinders and between the valve housing in the manner described above.

It will thus be seen that there is provided a device in which the several objects of this invention are achieved, and which is well adapted to meet the conditions of practical use.

As various possible embodiments might be made of the above invention, and as various changes might be made in the embodiments set forth, it is to be understood that all matter herein set forth or shown in the accompanying drawings is to be interpreted as illustrative and not in a limiting sense.

Having thus described my invention, I claim as new and desire to secure by Letters Patent:—

1. An internal combustion engine comprising a plurality of cylinders, a cylinder head for said cylinders, a casing arranged over said head, a blower for feeding air through the space between said head and said casing, a connection from the crank case of the engine to said blower to exhaust air from said crank case, the valve spring housings of said engine being provided with openings to permit inflow of atmospheric air therein, and the cylinder walls adjacent said valve spring housings being provided with openings whereby air may flow from said valve spring housing into said crank case.

2. An internal combustion engine comprising a plurality of cylinders, a cylinder head for said cylinders, a casing arranged over said head, a blower to deliver air through said casing, a plate arranged on the side of said engine and spaced therefrom, said cylinder head being provided with ports communicating with the space between said plate and engine, said cylinder head being further provided with ports communicating with the spaces around the valve housings to permit cooling of the valves.

3. An internal combustion engine having a chamber above the cylinder head, means for blowing air through said chamber, means associated with said blowing means for exhausting air from the crank casing of said engine, said crank casing having an opening communicating with the atmosphere, and a valve spring housing of said engine having an opening communicating with the interior of said crank casing.

4. An internal combustion engine having a chamber above the cylinder head, means for blowing air through said chamber, means associated with said blowing means for exhausting air from the crank casing of said engine, said crank casing having an opening communicating with the atmosphere, a valve spring housing of said engine having an opening communicating with said crank casing, and said valve spring housing having an opening communicating with the atmosphere.

5. In an internal combustion engine, means for blowing air over the cylinder head, means associated with said first means for exhausting air from the crank casing of said engine, and a pipe open to the atmosphere and extending into said casing and terminating below a piston of said engine.

6. An internal combustion engine comprising a plurality of cylinders, a cylinder head for said cylinders, a casing arranged over said head, a fan blower for feeding air through the space between said head and said casing, a conduit from the crank case of the engine to the inlet end of said blower to exhaust air from said crank case as the blower operates, an air feed pipe open to the atmosphere arranged adjacent said crank case, valved branches connecting said feed pipe to said crank case, said valved branches directing air to the inside of the pistons, and means controlled by the temperature of the engine for regulating said fan blower.

7. An internal combustion engine having a cylinder head and a chamber above the cylinder head, means for blowing air through said chamber, means associated with said blowing means for exhausting air from the crank casing of said engine, a valve spring housing of said engine having an opening communicating with said crank casing, said valve spring housing having an opening communicating with the atmosphere, and means controlled by the temperature of said engine for regulating said blowing means.

8. An internal combustion engine having a cylinder head and a chamber above the cylinder head, means for blowing air through said chamber, means associated with said blowing means for exhausting air from the crank casing of said engine, a valve spring housing of said engine having an opening communicating with said crank casing, said valve spring housing having an opening communicating with the atmosphere, means controlled by the temperature of said engine for regulating said blowing means, and means associated with said last mentioned means for simultaneously regulating the richness of mixture of fuel fed to said engine.

9. In combination with an internal combustion engine, fan blower means for blowing air over external portions of the cylinders of said engine, means associated with said blowing means for exhausting air from the crank case of said engine, the valve spring housings of said engine having openings communicating with the crank case, said valve spring housings further having openings communicating with the atmosphere.

10. In combination with an internal combustion engine, means for blowing air over external portions of the cylinders of said engine, controllable means associated with said first means for cooling the pistons within said cylinders, and controllable means associated with said first means for cooling the insides of the valve spring housings of said engine whereby distortion of the cylinder is prevented.

NORMAN EN HOLM.